United States Patent
Glenz et al.

(10) Patent No.: US 7,028,672 B2
(45) Date of Patent: Apr. 18, 2006

(54) FUEL SUPPLY SYSTEM FOR AN INTERNAL COMBUSTION ENGINE

(75) Inventors: Andreas Glenz, Kernen i.R. (DE); Guenter Hoenig, Ditzingen (DE); Eberhard Holder, Esslingen (DE); Martin Matt, Bruchsal-Untergrombach (DE); Andreas Posselt, Mühlacker (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 11/110,964

(22) Filed: Apr. 20, 2005

(65) Prior Publication Data

US 2005/0217642 A1    Oct. 6, 2005

Related U.S. Application Data

(63) Continuation-in-part of application No. PCT/EP2003/011105, filed on Oct. 8, 2003.

(30) Foreign Application Priority Data

Oct. 26, 2002    (DE) .................................. 102 49 954

(51) Int. Cl.
*F02M 43/00* (2006.01)
(52) U.S. Cl. ........................ 123/514; 123/457; 123/575
(58) Field of Classification Search ................ 123/585, 123/1 A, 3, 179.16, 575, 576, 457, 458, 459, 123/514
See application file for complete search history.

(56) References Cited

U.S. PATENT DOCUMENTS

| 4,794,889 | A  | * | 1/1989  | Hensel ................... 123/73 SC |
| 6,035,837 | A  |   | 3/2000  | Cohen |
| 6,067,969 | A  | * | 5/2000  | Kemmler et al. ........... 123/548 |
| 6,189,516 | B1 | * | 2/2001  | Hei Ma ..................... 123/524 |
| 6,467,470 | B1 |   | 10/2002 | Carlsson |

FOREIGN PATENT DOCUMENTS

| DE | 197 34 493 C1 | 11/1998 |
| DE | 201 05 866    | 9/2001  |
| DE | 101 54 455 A1 | 5/2003  |
| EP | 1 002 946 A2  | 5/2000  |
| FR | 2 777 605     | 10/1992 |
| WO | WO 94/24432   | 10/1994 |

\* cited by examiner

*Primary Examiner*—Tony M. Argenbright
*Assistant Examiner*—Katrina Harris
(74) *Attorney, Agent, or Firm*—Klaus J. Bach

(57) ABSTRACT

In a fuel supply system for an internal combustion engine having two separate storage containers for liquid fuels, both connected to a first controllable valve which is connected, via a connecting line including a fuel pump to an inlet of a second controllable valve having two outlets in communication by separate fuel lines with a fuel injection nozzle of the internal combustion engine, each of the two separate fuel lines includes a fuel pressure regulator, one being in communication with one and the other with the other of the two separate fuel storage containers for returning exess fuel to the fuel storage container from which fuel is being supplied to the fuel injection nozzle.

5 Claims, 6 Drawing Sheets

FUEL SUPPLY SYSTEM FOR AN INTERNAL COMBUSTION ENGINE

This is a Continuation-In-Part of International Application PCT/EP2003/011105 filed Oct. 8, 2003 and claiming the priority of German application 102 49 954.3 filed Oct. 26, 2002.

BACKGROUND OF THE INVENTION

The invention relates to a fuel supply system for an internal combustion engine having two separate fuel storage containers.

A fuel supply system of this type is known from DE 197 34 493 C1. This fuel supply installation is provided with a fuel tank for liquid fuel, from which a fuel feed line leads to an injection apparatus, with an evaporation and condensing device for low boiling-point fuel fractions, which is connected to the fuel tank, with an intermediate tank for the condensate, connected after the evaporation and condensing device, from which a condensate line leads to a control valve controlling the supply to the injection device, and with a residual fuel return line discharging the higher boiling-point residual fuel fractions accumulating in the evaporation and condensing device. The residual fuel return line opens into an additional tank, from which a residual fuel feed line leads to a changeover valve arranged in the fuel feed line. The control of the valve is such that, under full load of the internal combustion engine, the residual fuel from the residual fuel feed line is at least partly fed into the fuel feed line leading to the injection device.

WO 94/24432 discloses a method for monitoring the exhaust gas emissions of an internal combustion engine, which includes the extraction of a low boiling-point fuel fraction from normal gasoline or other liquid hydrocarbon fuels, the intention being for this low boiling-point fuel fraction to be fed to the combustion engine during a cold-start procedure in order to reduce the oxidizable contaminants in the exhaust gas of the internal combustion engine. This is to be done until the catalytic converter, which is used to reduce the contaminants in the exhaust gas of the engine, has reached its operating temperature. After that, the fuel supply to the engine is changed over to normal gasoline or other liquid hydrocarbon fuels.

Because of the compliance, required world-wide nowadays, with statutorily prescribed exhaust gas emission limiting values, a fuel supply installation having a fuel fractionation device for producing low boiling-point fuel fractions is needed on board a motor vehicle operated with internal combustion engines, in order to reduce the pollutant emissions arising during the operation of a motor vehicle in the cold-start and/or warm-up phase and to reduce the pollutant discharge overall. Previously known solutions feed low boiling-point fuel fractions on their own or mixed with the normal fuel to the internal combustion engine during a cold-start in order to reduce the pollutant discharge, the excess starting fuel frequently being consumed in the subsequent operating phases of the vehicle. This leads to increased starting fuel consumption.

It is therefore an object of the invention to provide a fuel supply installation for an internal combustion engine which, firstly, optimizes consumption of the starting fuel, and secondly has reduced pollutant emissions during the various operating phases of the motor vehicle.

SUMMARY OF THE INVENTION

In a fuel supply system for an internal combustion engine having two separate storage containers for liquid fuels, both connected to a first controllable valve which is connected, via a connecting line including a fuel pump to an inlet of a second controllable valve having two outlets in communication by separate fuel lines with a fuel injection nozzle of the internal combustion engine, each of the two separate fuel lines includes a fuel pressure regulator, one being in communication with one and the other with the other of the two separate fuel storage containers for returning exess fuel to the fuel storage container from which fuel is being supplied to the fuel injection nozzle.

With this arrangement excess fuel can be fed back into the respective storage container, separated in accordance with main fuel and starting fuel. As a further advantage, in this way it is possible for starting fuel once obtained to be saved, in order to have it available in the shortest possible time, for example for reducing the exhaust gas emissions in cold-start situations. As a result of the considerable reduction in the pollutant emission, in particular in the emission of hydrocarbons, this results firstly in a reduction in the noble metal content needed in the exhaust gas catalytic converters, secondly the omission of the catalytic converters close to the engine, which, because of the high temperatures in this region, would be subjected to rapid ageing.

According to a preferred embodiment, the two fuel lines starting from the second valve are fed to different inlet openings of the injection valve of the internal combustion engine.

In a very advantageous embodiment of the invention the fuel supply installation is provided with a control unit for controlling the two controllable valves, which is designed in such a way that fuel from only one of the storage containers in each case is fed to a specific inlet opening of the injection valves of the internal combustion engine.

According to the invention, furthermore, one of the storage containers for liquid fuel is designed as a vehicle tank for main fuel, the other for starting fuel.

Because of the aforementioned advantages, the apparatus according to the invention is suitable for use in all mobile systems, such as passenger and utility vehicles.

The invention will now be described on the basis of the appended schematic drawing.

DESCRIPTION OF PREFERRED EMBODIMENTS

Figure 1:
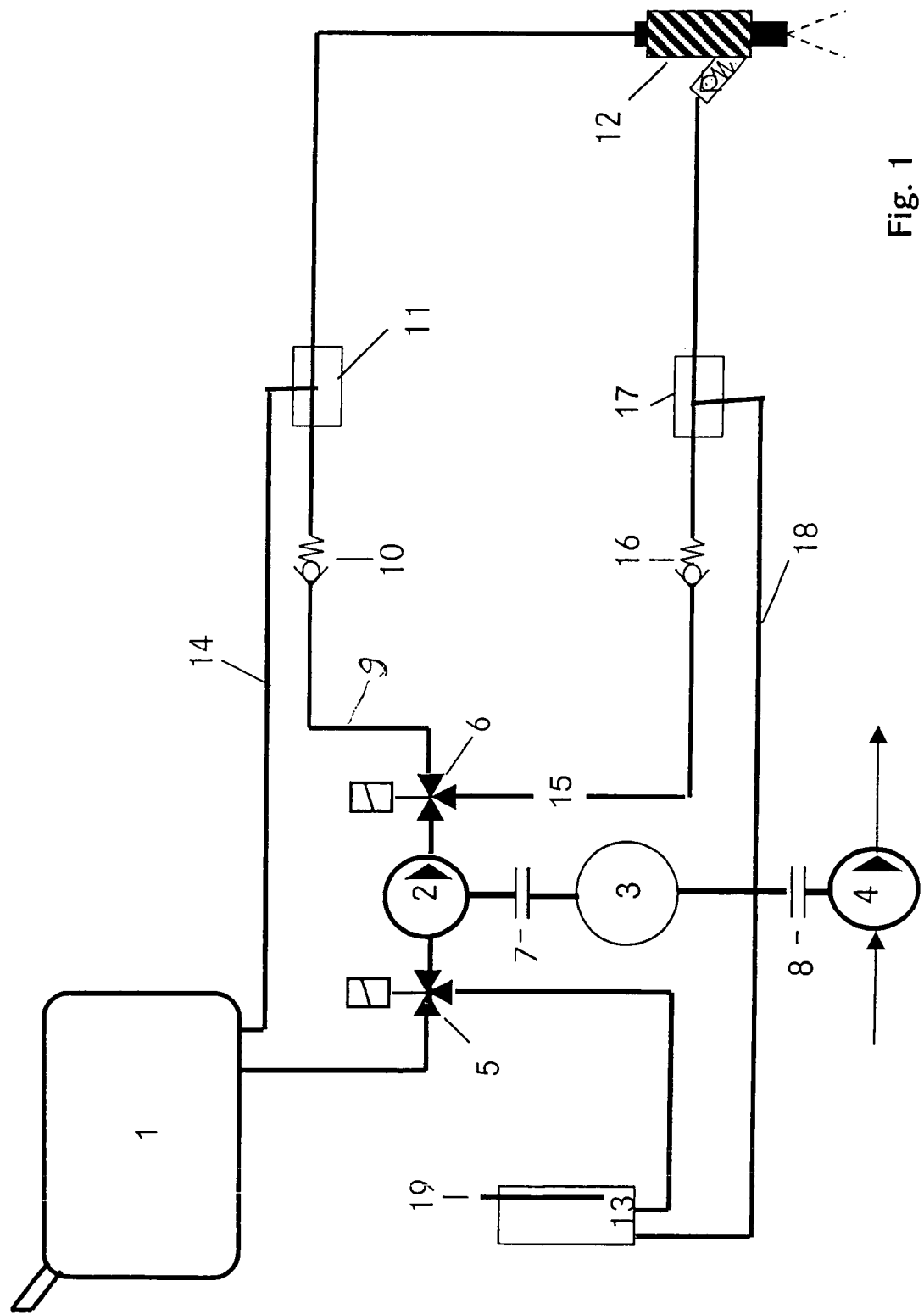
FIG. 1 shows a preferred embodiment of the overall fuel supply system according to the invention.

FIG. 1 shows the overall fuel supply system, the operating modes or functions of the installation being illustrated in FIGS. 2 to 6: Operation with main fuel, flushing with starting fuel, operation with starting fuel, first filling with starting fuel and the operation of the gas delivery pump, which will be explained below. The overall system advantageously permits, firstly, the production of starting fuel and, secondly, the simultaneous management of the delivery of main fuel and starting fuel.

FIG. 1 shows a pump unit comprising a fuel pump 2, an electric motor 3 and a gas delivery pump 4. A clutch 7 is provided between the fuel pump 2 and the electric motor 3, and a clutch 8 is provided between the electric motor 3 and gas delivery pump 4. The fuel pump 2, arranged between a valve 5 and 6, takes in the main fuel from the main fuel tank 1, given an appropriate position of the valve 5. Via a valve 6, the main fuel reaches the main fuel line 9 to the injection valve 12. Between valve 6 and the injection valve 12 there is a fuel pressure regulator 11 in the main fuel line 9, a return line 14 to the main fuel tank 1 being provided, starting from the fuel pressure regulator 11. Between valve 6 and the fuel pressure regulator 11 there is a check valve 10 in the main fuel line 9.

The valve 5 is now set such that, by means of the fuel pump 2 driven by the electric motor 3, starting fuel is taken in from a starting fuel tank 13 and can either be introduced into the main fuel line 9 via the valve 6 or into the starting fuel line 15. Between the valve 6 and the injection valve 12 there is a fuel pressure regulator 17 in the starting fuel line 15, a return line 18 to the starting fuel tank 13 being provided, starting from the fuel pressure regulator 17. Between valve 6 and the fuel pressure regulator 17 there is another check valve 16.

Figure 2:
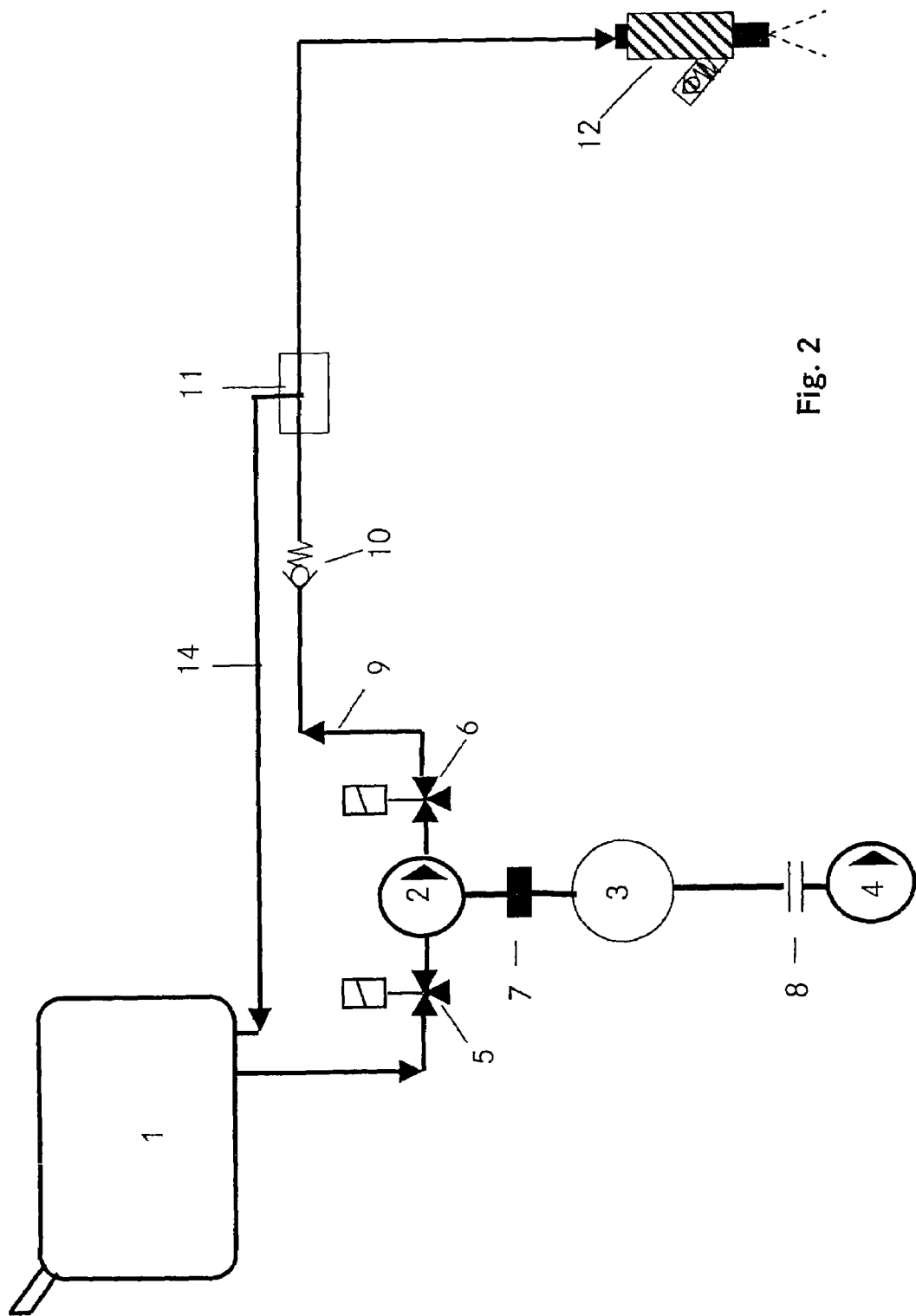
FIG. 2 shows the operation of a fuel supply system with the main fuel after conclusion of the warm-up period or during a warm-start of the motor vehicle

As illustrated by way of example in FIG. 2, the basic drawing shows the operation of a fuel supply installation with the main fuel following the conclusion of the warm-up or during the warm-start of the motor vehicle. For this purpose, the electric motor 3 drives the fuel pump 2 via the engaged clutch 7, the clutch 8 being disengaged. The valve 5, which is in particular a 3-way valve, preferably an electrically operated solenoid valve, is set such that the fuel pump 2 takes in main fuel from the main vehicle fuel tank 1. Via a valve 6, in particular a 3-way valve, preferably an electrically operated solenoid valve, the main fuel reaches the main fuel line 9 to the injection valve 12, which controls the injection into the internal combustion engine, not specifically illustrated. Instead of an injection valve with a lateral nonreturn valve, a lance-like fuel distributor with nonreturn valve integrated into the lance can also be provided. A fuel pressure regulator 11 regulates the injection pressure into the internal combustion engine. Between valve 6 and the fuel pressure regulator 11 there is an additional valve 10 in the main fuel line, preferably a nonreturn valve.

Figure 3:
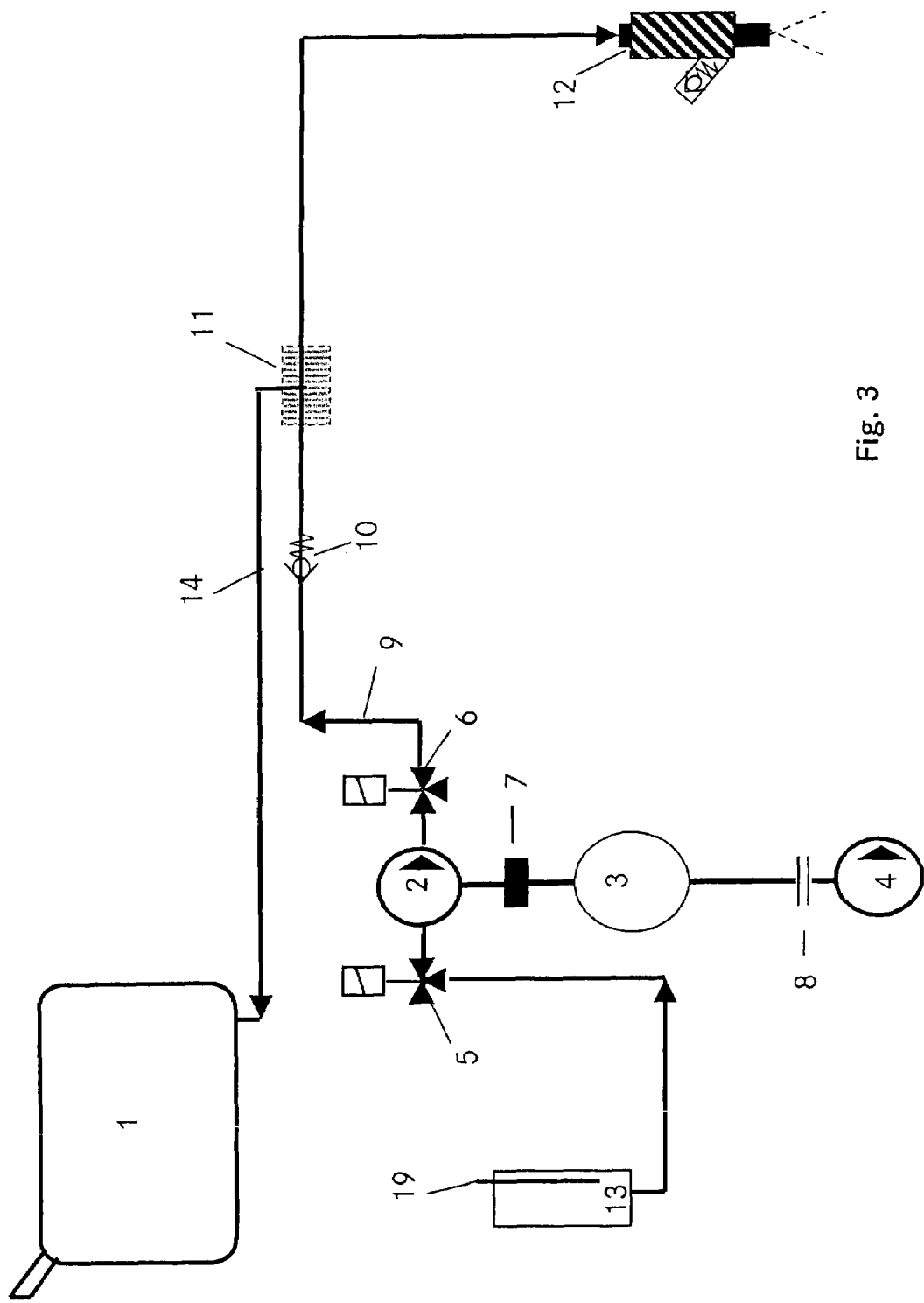
FIG. 3 shows the flushing of the fuel pump with starting fuel before the start of the internal combustion engine

FIG. 3 describes schematically the flushing of the fuel pump 2 with starting fuel before starting the still cold internal combustion engine. The fuel pump 2 is filled with main fuel from the last time the vehicle was switched off. However, in order to be able to supply the internal combustion engine with pure starting fuel precisely at the beginning of the start, flushing with starting fuel is necessary. For this purpose, the electric motor 3 drives the fuel pump 2 via the engaged clutch 7. Clutch 8 is disengaged during this operation. The valve 5 is set such that the fuel pump 2 takes in starting fuel from the starting fuel tank 13 and delivers it into the main fuel line 9 via a valve 6. The starting fuel reaches the main fuel tank 1 via the fuel pressure regulator 11 and the fuel return line 14. The injection valve 12 for the internal combustion engine still remains closed during this operation. After a short time, the valve 6 is changed over in such a way that the starting fuel reaches the starting fuel line 15, illustrated in FIG. 4. Between the valve 6 and the fuel pressure regulator 17 there is an additional valve 16 in the starting fuel line 15, preferably a nonreturn valve. The cold internal combustion engine can now be started. During cold-start and warm-up, the engine is operated with starting fuel.

Figure 4:
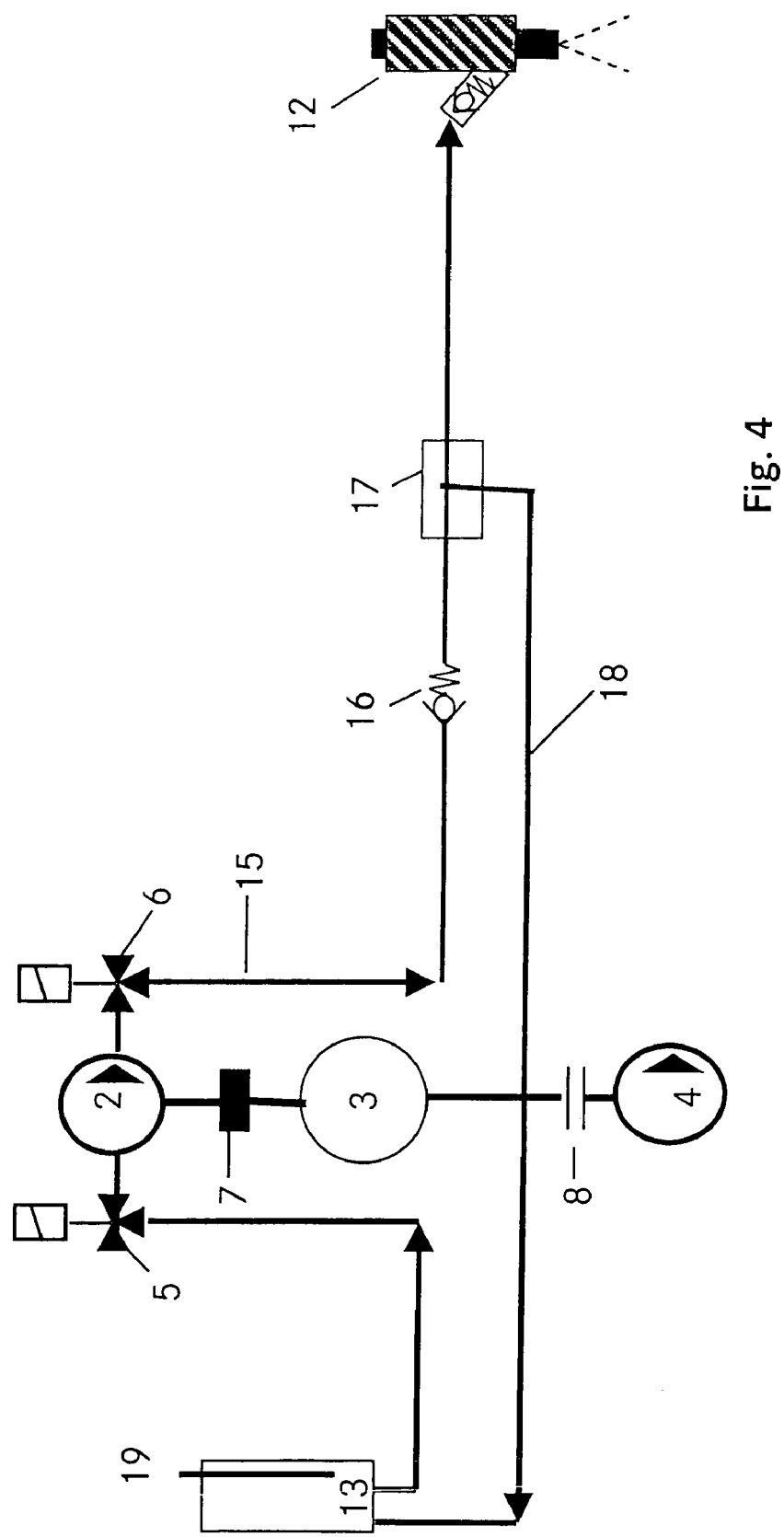
FIG. 4 shows the operation of a fuel supply system with starting fuel during cold-start and warm-up of the motor vehicle

After the flushing with starting fuel has been carried out in accordance with FIG. 3, the valve 6, as shown in FIG. 4, is set such that the excess starting fuel passes back into the starting fuel tank 13 via the fuel pressure regulator 17 and a starting fuel return line 18. This saves starting fuel in an extremely advantageous manner. Following the conclusion of the warm-up, the system is switched over to operation with main fuel, as described in FIG. 2.

Figure 5:
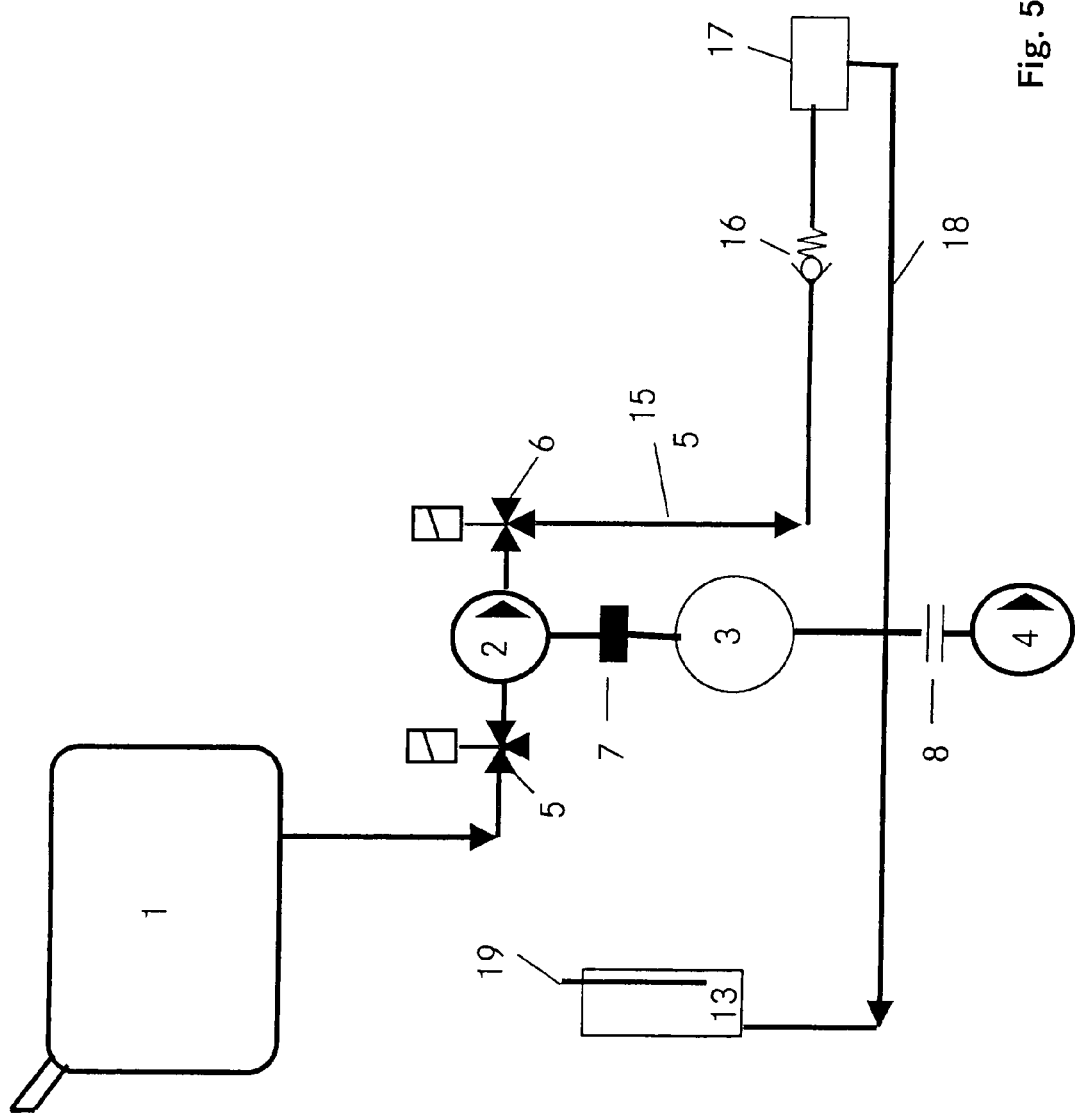
FIG. 5 shows first filling with starting fuel.
Figure 6:
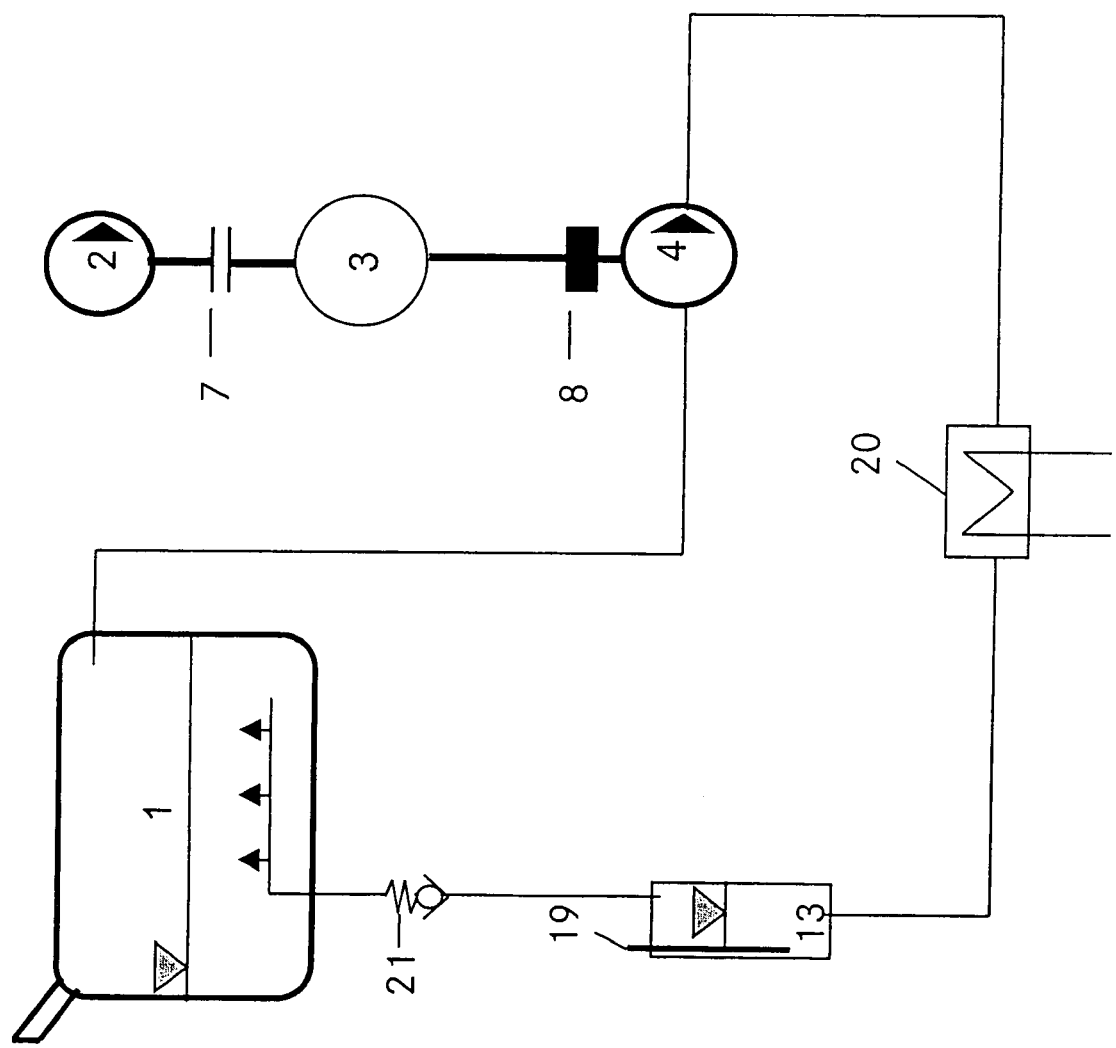
FIG. 6 shows the operation of the gas delivery pump.

The first filling with starting fuel is carried out, as shown in FIG. 5, during the first commissioning or following a repair, since in this situation there is still no starting fuel in the starting fuel tank 13 and in the starting fuel line 15. In order that, despite this, the first start can be carried out with starting fuel and the starting fuel line 15 can be filled, a small amount of starting fuel is put into the main fuel tank 1. The electric motor 3 drives the fuel pump 2 via the engaged clutch 7. In this case, the clutch 8 is disengaged. Valve 5 is set such that the fuel pump 2 takes in starting fuel from the main fuel tank 1. Via valve 6, the starting fuel reaches the starting fuel line 15 to the injection valve 12 of the internal combustion engine. The internal combustion engine can then be started. Via the fuel regulator 17 and the starting fuel return line 18, the excess starting fuel passes back into the starting fuel tank 13 and fills the latter. If, during the warm-up, the upper limiting value is indicated by the level meter 19 in the starting fuel tank, the valve 5 is changed over in such a way that the fuel pump 2 then takes starting fuel from the starting fuel tank, as shown in FIG. 4, until the warm-up has been concluded. After that, the main fuel tank 1 can be filled with main fuel.

Following the conclusion of the warm-up, the starting fuel consumed has to be topped up again by the operation of the gas delivery pump 4 of the fuel fractionation unit. This is illustrated schematically in FIG. 6. In this case, during the operation with main fuel, the clutch 8 is engaged, so that the gas delivery pump 4 is also driven. The latter takes in air and fuel vapor from the main fuel tank 1 and compresses the mixture. The mixture cools down in a following heat exchanger 20, so that the fuel fractions condense. The remaining air delivers the fuel condensate into the starting fuel tank 13, where it is depressurized to ambient pressure after the pressure relief valve 21 and passes into the main fuel tank 1 again via a distributor pipe. As the air bubbles rise, the latter are enriched with the lower boiling-point fuel fraction. The circuit begins again. If the level meter 19 indicates the upper limiting value during the fractionation, the fractionation is ended by disengaging the clutch 8. If, before the upper limiting value is reached, the internal combustion engine should be switched off in the meantime, this means that the fuel pump 2 is switched off at the same time. In order that the fractionation can nevertheless be continued until the upper level mark has been reached, the clutch 7 can be disengaged and fractionation can be completed.

Previously known solutions describe a fuel circuit of a vehicle having an additional starting fuel circuit for reducing emissions, in particular in the cold-start phase. In this case, the delivery of the main fuel is carried out separately from the delivery of the starting fuel. This implies two separate drives for the respective pumps of the two separate systems. Such installations are frequently very complex in terms of apparatus and of complicated design and therefore need a large overall volume with a corresponding overall weight. Accordingly, by combining the fuel supply unit, containing a pump unit and a starting fuel tank, which are integrated into the main fuel tank of an internal combustion engine, to form one structural unit, the result is advantageously, firstly, a reduction in the volume of such a fuel supply unit and also a substantially lower constructional outlay, and secondly, as a result of the use of the electric motor as a drive for both pump systems, fuel pump and gas delivery pump, an additional drive is not required, such as would have been needed with a separate operation of the two systems. The omission of the additional drive therefore leads to a cost reduction in the production of the component. Furthermore, in the event of maintenance of the fuel supply unit, this can be removed from the fuel container without great effort. Also, the encapsulation of the pump unit results in a noise attenuation. In addition, the fuel supply unit configured in this way can be integrated without difficulty into any fuel container without the respective fuel container having to be specifically adapted thereto. This shortens the development times considerably and saves the costs of the adaptation to the respective fuel container of a vehicle. By means of appropriate switching of the valves 5 and 6, during the first commissioning of a vehicle by means of a pump (the fuel pump 2), the fuel supply installation additionally permits the immediate filling of the main fuel tank with starting fuel. At this point, this in turn advantageously contributes to the reduction in emissions.

The operation of the fuel fractionation unit is based on the idea of entrained gas fractionation and is described extensively in patent specification DE 199 27 177 C1.

The invention claimed is:

1. A fuel supply system for an internal combustion engine having two separate storage containers (1, 13) for liquid fuel, a first controllable valve (5) having two inlets, connected via fuel lines each to one of the storage containers (11, 13) and an outlet, which is connected by a fuel pump (2) to the inlet of a second controllable valve (6), the second controllable valve (6) having two outlets extending to a fuel injection nozzle of the internal combustion engine via two separate fuel lines (9, 15), each of two separate fuel lines containing a fuel pressure regulator (11, 17) between the second valve (6) and the fuel injection nozzle (12) and each fuel regulator being in communication with one of the fuel storage containers by a return line (14, 18) extending to the respective storage containers (1, 13) from the respective fuel pressure regulator (11, 17).

2. The fuel supply system as claimed in claim 1, wherein the two fuel lines (9, 15) extend from the second valve (6) to different inlet openings of the fuel injection valve (12) of the internal combustion engine.

3. The fuel supply system as claimed in claim 2, including a control unit for controlling the two controllable valves (5, 6), in such a way that fuel from only one of the storage containers (1, 13) in each case is fed to a specific inlet opening of the injection valve (12) of the internal combustion engine.

4. The fuel supply system as claimed in claim 1, wherein the one storage container (1) for liquid fuel is a vehicle tank for receiving a main fuel.

5. The fuel supply system as claimed in claim 2, wherein the other storage container (13) for liquid fuel is a tank for starting fuel having a lower boiling point than the main fuel.

* * * * *